United States Patent [19]

Teramachi

[11] 4,231,621
[45] Nov. 4, 1980

[54] SLIDING ROLLER BEARING WITH HEIGHT ADJUSTOR

[76] Inventor: Hiroshi Teramachi, 2-34-8, Higashi-Tamagawa, Setagaya-ku, Tokyo, Japan, 158

[21] Appl. No.: 26,453

[22] Filed: Apr. 2, 1979

[30] Foreign Application Priority Data

May 4, 1978 [JP] Japan .............................. 53-052791

[51] Int. Cl.$^2$ ...................... F16C 29/12; F16C 29/06
[52] U.S. Cl. ................................. 308/6 C; 308/6 R
[58] Field of Search .............. 308/6 C, 6 R, 203, 6 A, 308/7, 6 B, 3 R

[56] References Cited

U.S. PATENT DOCUMENTS

| | | | |
|---|---|---|---|
| 3,843,215 | 10/1974 | McCloskey | 308/6 R |
| 3,907,385 | 9/1975 | Bartenstein | 308/6 C |
| 4,120,538 | 10/1978 | Headen | 308/6 C |

Primary Examiner—Lenard A. Footland
Attorney, Agent, or Firm—George B. Oujevolk

[57] ABSTRACT

A sliding roller bearing with a height adjustor for supporting a column section in vertical type machines such as electro-spark erosion machines and a slide section in industrial machines. The roller bearing comprises a number of balls received between a bearing body and a retainer, and a track shaft received in the bearing. The bearing body is formed in its upper flat surface with a tapered groove in which a tapered gib having a flat upper surface and a lower surface conforming to the bottom of the tapered groove is received for sliding movement. The tapered gib has a threaded hole extending centrally and longitudinally therethrough. An adjusting bolt is threadedly engaged with the threaded hole and is formed at its one end portion with a male screw having a pitch larger than that of the threaded hole. The male screw is threadedly engaged with a flange of the bearing body so that the rotation of the screw in either direction causes the lateral movement of the rib which in turn results in the change in the bearing height.

2 Claims, 7 Drawing Figures

SLIDING ROLLER BEARING WITH HEIGHT ADJUSTOR

BACKGROUND OF THE INVENTION

This invention relates to a sliding rotary bearing with a height adjustor for use in a slide section of tool machines, forming machines, spark erosion machines and other industrial machines for adjustment of the height of the sliding ball bearing.

A slide section such as a table of a planning machine is generally mounted on a pair of spaced parallel track shafts each received in a bearing unit and fixed on a bed of the machine. In order to obtain the horizontality of the table of a planing machine it is thus necessary to make equal the heights from the bottom surface of the respective track shafts to the upper surface of the bearing unit. However, this has been very difficult to be attained, since the track shafts and the bearings are separately produced. Furthermore, with slide type bearing units used as means for supporting therebetween a vertically slidable column of a vertical type machine such as an electro-spark erosion machine, spring means or a fine adjustment mechanism has been required for adjustment of the verticality of column. The conventional adjustment mechanism, however, requires high costs.

SUMMARY OF THE INVENTION

It is an object of the present invention to provide a sliding ball bearing with a height adjustor which permits adjustment of the distance between a track shaft fixed to a movable or fixed bed or column and a bearing by turning an adjusting bolt in clockwise or counterclockwise direction to move the bearing, relative to the track shaft in the direction normal to the axis of the bolt.

Another object of the present invention is to provide a sliding ball bearing with a height adjustor in which a track shaft is received in four load ball trains so that a large load may be applied in any radial directions.

DETAILED DESCRIPTION OF THE INVENTION

Preferred embodiments of the present invention will be described hereinafter in connection with the sliding ball bearing unit used for supporting a vertically movable column.

Figure 1:
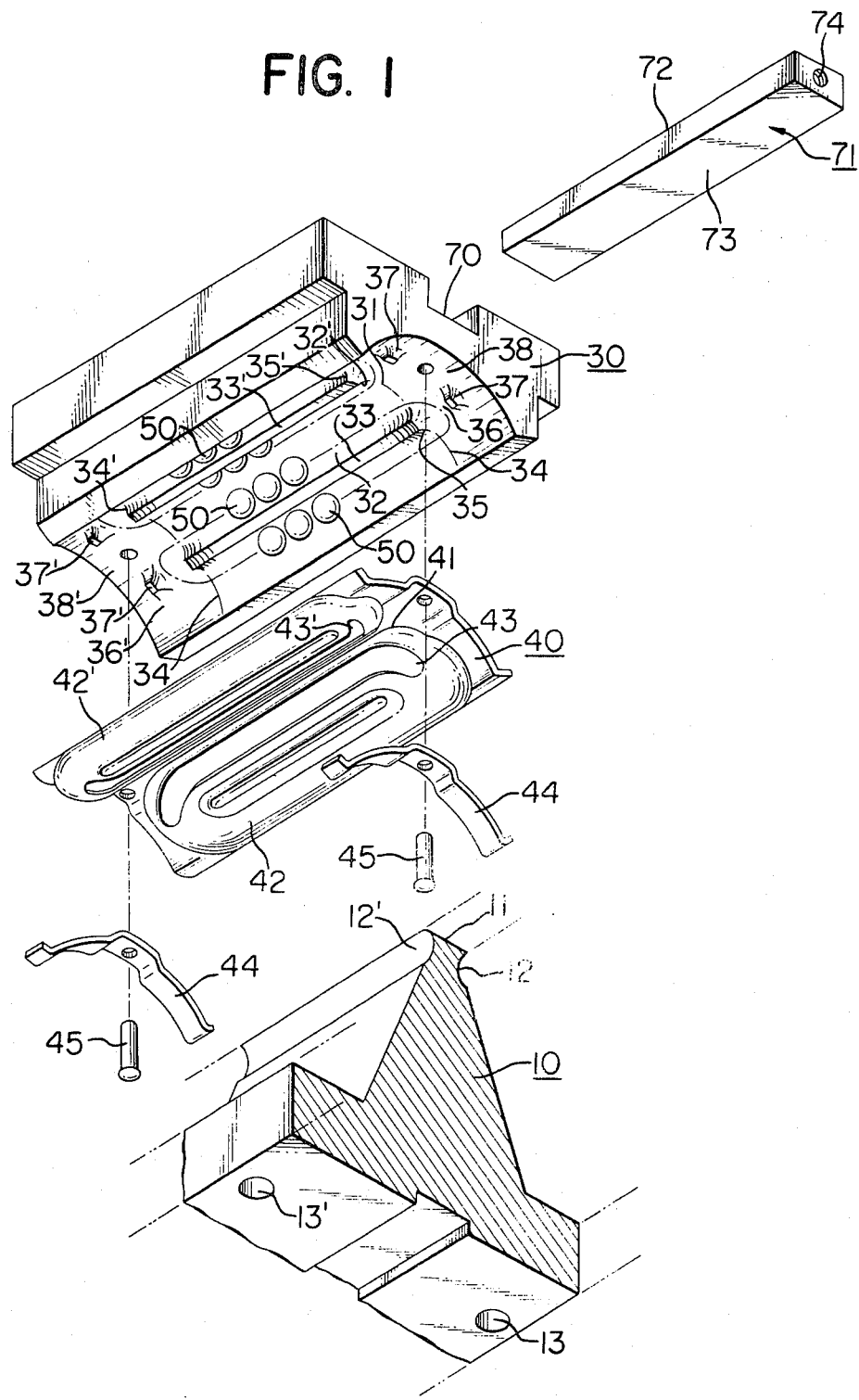
FIG. 1 is an exploded perspective view of the bearing portion of a sliding ball bearing with an adjustor of the present invention.

Referring first to FIG. 1, the reference numeral 10 designates a track shaft formed of a high-rigidity material such as steel, which includes a longitudinally extending projection 11 formed in its opposite side surfaces with two grooves 12 and 12'. Formed in the base portion of the track shaft 10 are a number of mounting holes 13, 13', etc. spaced with a suitable pitch for mounting of the track shaft 10 to a movable column 20. The grooves 12 and 12' to be engaged by bearing balls are subjected to heat treatment such as high frequency quenching to have a proper wear resistance and mechanical strength.

Designated at 30 is a bearing body formed of steel or any other suitable material having a high rigidity. The bearing body 30 is of a substantially rectangular shape having a flat upper surface and a lower surface formed with a recess having a substantially arc cross section. In the recess there is formed a first U-shaped groove 31 extending centrally and longitudinally thereof so as to form left and right load ball guide grooves 32 and 32'. Provided in parallel with the first U-shaped groove 31 are partitions 33 and 33 having a suitable wall width so as to form second U-shaped grooves 34 and 34' having a depth longer than that of the first U-shaped groove 31. The second U-shaped grooves 34 and 34' define non-load ball guide grooves 35 and 35'. Near the opposite ends of the guide grooves, there are formed first circumferential grooves 36 and 36' having the same depth as that of the load ball guide grooves 32 and 32' and tapered escape portions for connecting the first circumferential grooves 36 and 36' to the first U-shaped groove 31 without any step.

Indicated at 37 and 37' are retainer support portions which are defined by the first U-shaped groove 31, the second grooves 34 and 34', first circumferential grooves 36 and 36', and second circumferential grooves 38 and 38' for changing the direction of travel of steel balls 50, 50, etc. and retaining them.

Figure 3:
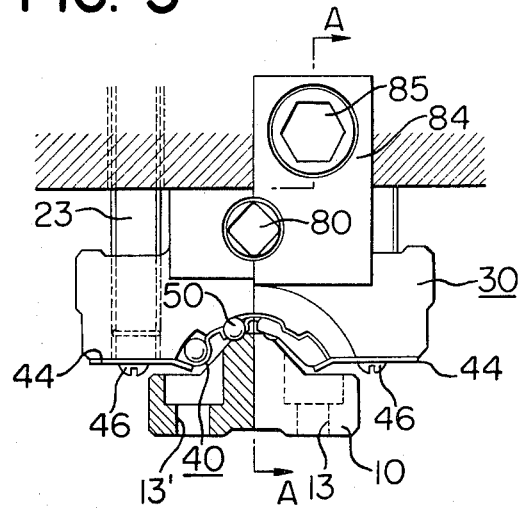
FIG. 3 is a sectional view taken along the line C—C of FIG. 2.

Designated at 40 is a retainer preferably made of a steel plate pressed to have a configuration substantially of a sector cross section including annular recesses 42 and 42' in the opposite sides of a center partition 41 and slits 43 and 43' having a width slightly smaller than the diameter of the steel ball 50, the slits formed at the position corresponding to the load ball guide grooves 32 and 32'. The retainer 40 is fixed at its front and rear ends to the bearing body 30 by means of rivets 45 and 45, supported at its opposite sides by means of side plates 44 and 44, and fixed to the bearing body 30 by means of separated screws 46 and 46 (FIG. 3).

Figure 2:
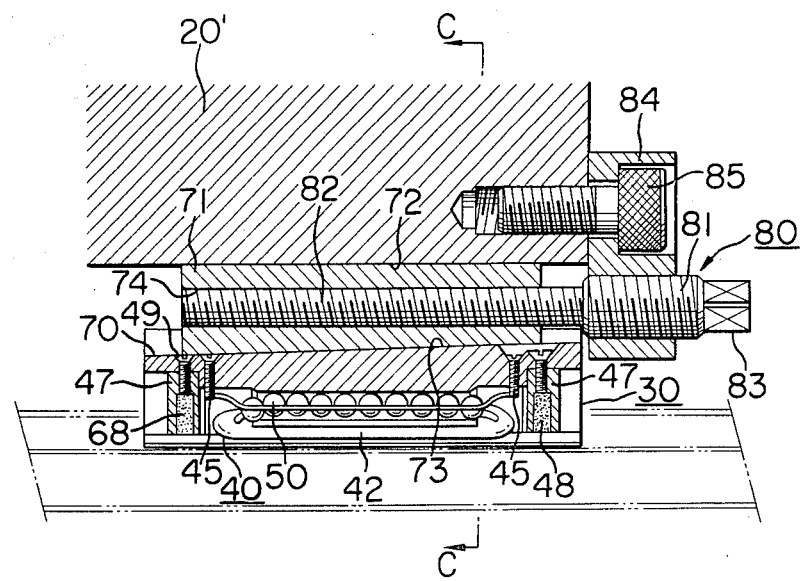
FIG. 2 is a sectional view taken along the line A—A of FIG. 3.

As shown in FIG. 2, a felt casing 47 is preferably attached to each opposite axial side of the bearing body 30. The felt casing 47 is charged with felt 48 for keeping the bearing track surface free from any foreign matter attached to the track shaft 10. The felt casing 47 is fixed to the bearing body 30 by means of screws 49 and 49.

The bearing body 30 has its upper flat surface formed with an axially extending groove 70 as shown in FIG. 1. The bottom surface of the groove 70 is tapered as for example 1/20. A tapered gib 71 having a lower surface conforming to the bottom surface of the groove 70 is received in the groove 70 for sliding movement. The tapered gib has a flat upper surface and a centrally and longitudinally extending threaded hole 74. Referring FIGS. 2 and 3, an adjusting bolt 80 has a male screw 82 threadedly engaged with the threaded hole 74. The adjusting bolt 80 has, in addition to the left small diameter male screw 82 threaded with a pitch for example 15, a right large diameter male screw 81 threaded with a pitch for example 10, and a right end portion 83 at which the operator can turn it by means of a spanner. The right large diameter male screw 81 of the adjusting bolt 80 is threadedly engaged with the mounting flange 84 which is attached to a fixed column or bed 20' by means of a bolt 85.

Description will now be made on usage of the adjusting bolt 80. Provided are left- and right-hand (upper and lower in FIG. 4) bearing units each comprising a bearing and a track shaft. The left-hand bearing unit is fixed through a mounting bolt 21 to the side wall of the column movable upward and downward after assuring of the verticality of the track shaft 10'. The bearing 90 slidably engaged with the track shaft 10' is fixed to the fixed column 20' by means of mounting bolts 91 and 91.

In the right-hand bearing unit, the track shaft 10 of the present invention is fixed to the side wall of the movable column 20 by means of bolts 22 and 22 and the bearing 30 is temporarily fixed to the fixed column 20' by means of mounting bolts 23 and 23. The bearings 30 and 90 are pushed against the reference surface 27 of the fixed column 20' by means of set screws 26. Now, when the column 20 is found to be loosely supported, the mounting bolts 23 are loosened and the adjusting bolt 80 is rotated through, for example, one revolution in a counter-clockwise direction, so that the height H of the bearing unit (30, 10) will be increased. (corresponding to M1 of FIG. 4) That is, the tapered gib 71 threadedly engaged with the adjusting bolt 80 will move by one pitch in the rightwise direction in FIG. 5 since the adjusting bolt per se is held such as not to advance and retard. Thus, the height H increases, in this case, by $(1.75-1.25) \times 1/20 = 0.025$ mm since the tapered gib 71 slides along the bottom surface tapered as 1/20. After proper adjustment of the height, the mounting bolts 23 are tightened and movement of the movable column is assured. If the height H is desired to decrease, the adjusting bolt 80 may be turned in the opposite direction.

Fine adjustment is possible even when a load is applied on the bearing such as for supporting thereon a horizontally slidable table since the adjusting arrangement of the present invention includes a fine advancing mechanism by the adjusting bolt pitch difference, an advancing force multiplication mechanism of the screw, and a force multiplication mechanism of the tapered gib.

Figure 4:
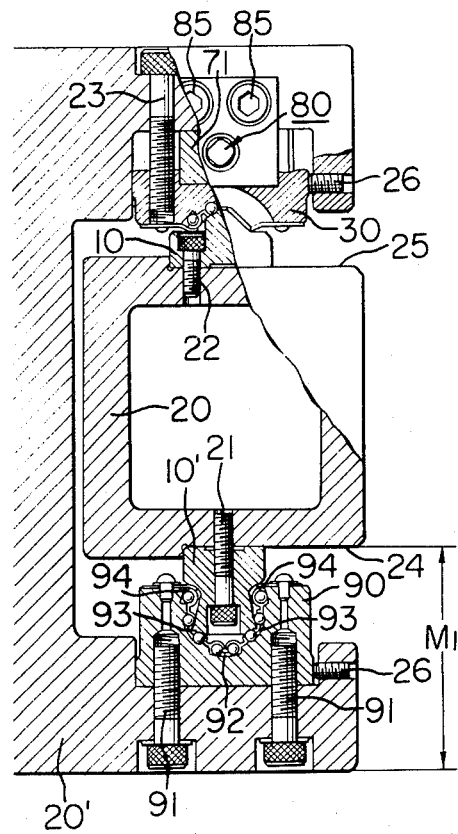
FIG. 4 is a plan view partly in cross section showing the sliding ball bearing set on a column.
Figure 6:
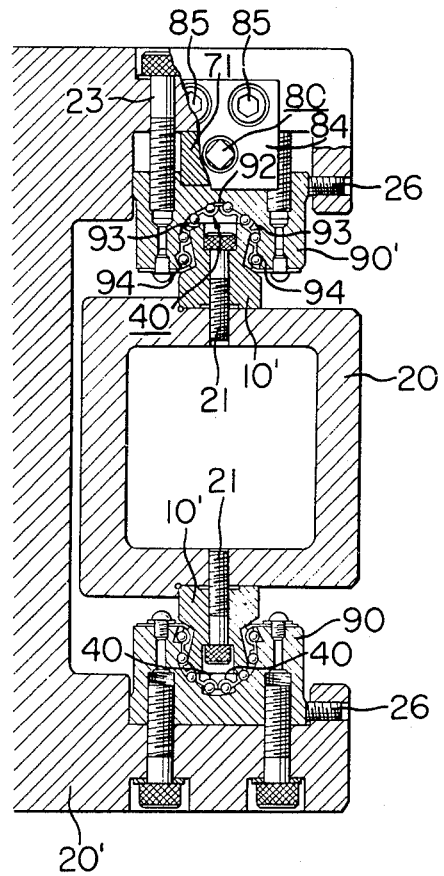
FIGS. 6 and 7 are sectional views showing an alternative embodiment of the present invention.
Figure 5:
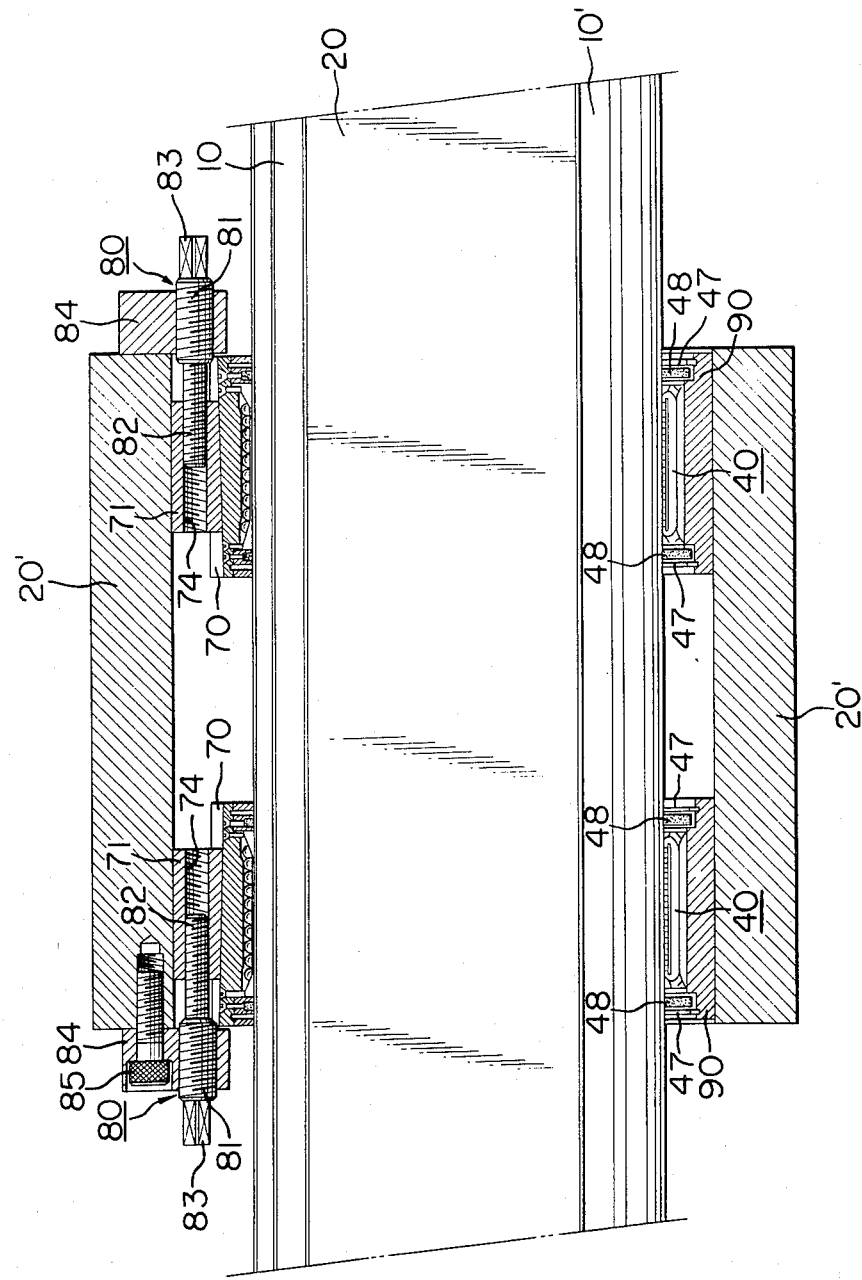
FIG. 5 is an elevational view in section showing the sliding ball bearing set on a column.
Figure 7:
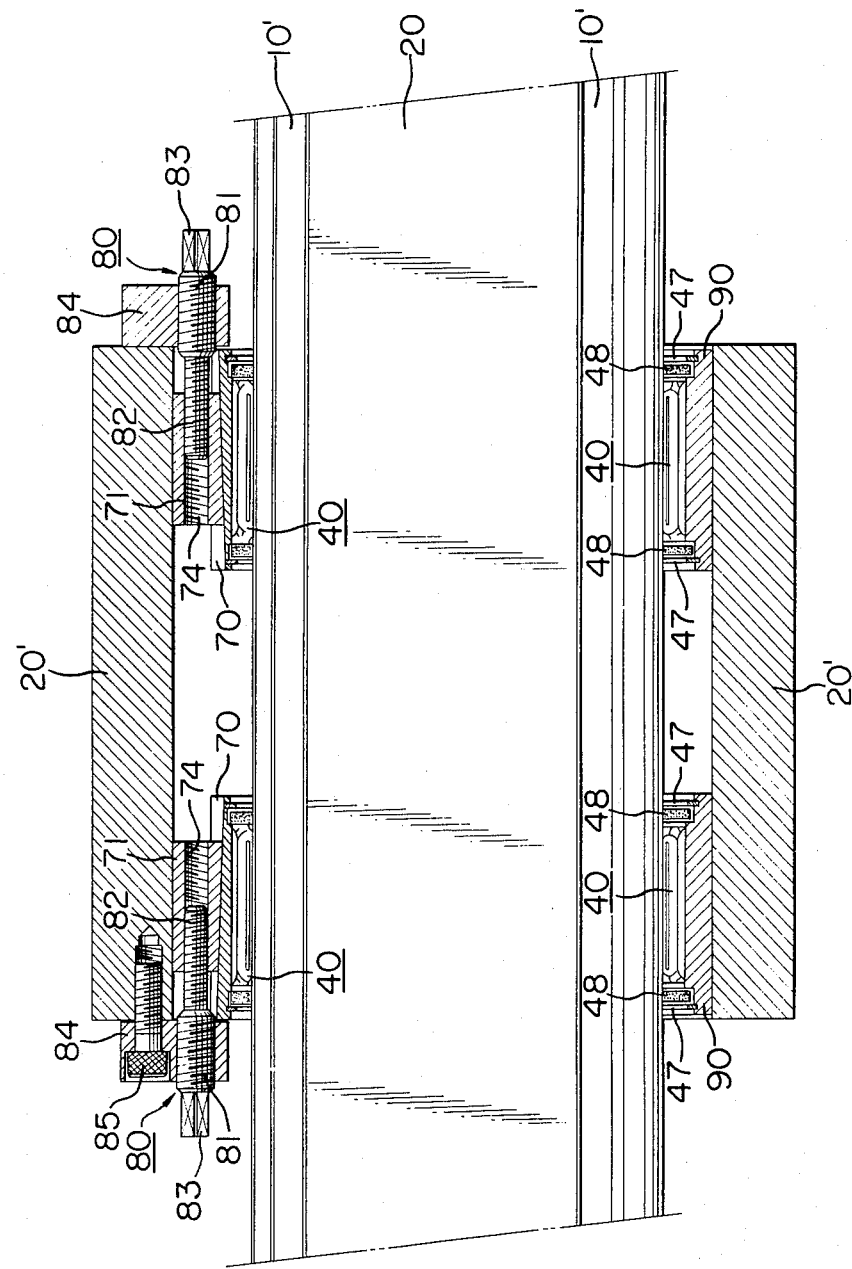

FIGS. 6 and 7 illustrates an alternative embodiment of the present invention in which the bearing body 90' is formed in its lower opening with a centrally and longitudinally extending non-load ball guide groove 92, load ball guide grooves 93 and 93 in the opposite sides of the center guide groove 92, and non-load ball guide grooves 94 outside the respective guide grooves 93 and 93, which is similar to the bearing body equipped with no adjustor of FIG. 4. The bearing body 90' has circumferentially extending grooves similar to those shown in FIG. 1.

The retainer 40 has annular grooves in the opposite sides of a center partition and slits in the position corresponding to the load ball guide grooves. The retainer 40 is assembled with the bearing body. The bearing body 90' has its upper surface formed with a tapered groove 70 similar to that shown in FIG. 1 and a tapered gib 71 is received in the tapered groove 70 for sliding movement.

What is claimed is:

1. A sliding roller bearing comprising: a bearing member forming at one side an open ended bearing chamber and at the other side a flat surface formed with a tapered groove; an elongated track shaft having a longitudinal portion engageable with said bearing chamber; a tapered gib having a flat upper surface, a lower surface conforming to the bottom of said tapered groove, and a threaded hole extending centrally and longitudinally therethrough, said tapered gib being received in said tapered groove for sliding movement; and an adjusting bolt having at one end portion a male screw threadedly engaged with said threaded hole and at a middle portion a second male screw threadedly engaged with a flange portion of said bearing member so that the revolution of the bolt causes sliding movement of the tapered gib in said tapered groove, thereby causing a change in the distance between the said flat upper surface of said gib and the bottom surface of said track shaft.

2. A sliding roller bearing comprising: a bearing body formed with a centrally and longitudinally extending load or non-load ball guide groove, non-load or load ball guide grooves in the opposite sides of the center guide groove, and circumferentially extending grooves connecting the first and second described guide grooves near the front and rear ends of the bearing body; a retainer formed with annular grooves at the positions corresponding to the guide grooves of the bearing body, the load ball grooves of the annular grooves being formed with a slit having a width slightly smaller than the diameter of the ball; a number of balls received between the bearing body and the retainer; a track shaft assembled with the bearing body, the bearing body being formed in its upper surface with a tapered groove; a tapered gib having a flat upper surface, a lower surface conforming to the bottom of the tapered groove of the bearing body, and a threaded hole extending centrally and longitudinally therethrough, the tapered gib being received in the tapered groove of the bearing body for sliding movement; and an adjusting bolt having a first male screw threadedly engaged with the threaded hole of the tapered gib and a second male screw having a pitch larger than that of said first male screw, said second male screw being threadedly engaged with the flange of the bearing body so that the revolution of the bolt causes sliding movement of the tapered gib.

* * * * *